US010507393B2

(12) United States Patent
Barnes et al.

(10) Patent No.: US 10,507,393 B2
(45) Date of Patent: Dec. 17, 2019

(54) COLLABORATIVE MOBILE MUSIC GAMING COMPUTER APPLICATION

(71) Applicant: SNDRND, LLC, Long Island City, NY (US)

(72) Inventors: Dasean Barnes, Montclair, NJ (US); Bryan A. Brooks, Long Island City, NY (US); Naledi Khabo, Jersey City, NJ (US); Reggie Miller, Jersey City, NJ (US); Gary R. Lewis, Fort Lauderdale, FL (US)

(73) Assignee: Bryan A. Brooks, Long Island City, NY (US)

( * ) Notice: Subject to any disclaimer, the term of this patent is extended or adjusted under 35 U.S.C. 154(b) by 110 days.

(21) Appl. No.: 15/947,623

(22) Filed: Apr. 6, 2018

(65) Prior Publication Data
US 2019/0308106 A1  Oct. 10, 2019

(51) Int. Cl.
*A63F 13/80* (2014.01)
*A63F 13/46* (2014.01)
*A63F 13/63* (2014.01)
*A63F 13/79* (2014.01)
*A63F 13/92* (2014.01)
*A63F 13/25* (2014.01)
*A63F 13/33* (2014.01)

(52) U.S. Cl.
CPC ............. *A63F 13/80* (2014.09); *A63F 13/46* (2014.09); *A63F 13/63* (2014.09); *A63F 13/79* (2014.09); *A63F 13/25* (2014.09); *A63F 13/33* (2014.09); *A63F 13/92* (2014.09); *A63F 2300/8047* (2013.01)

(58) Field of Classification Search
CPC ..... A63F 13/814; G06F 3/165; G06F 16/4387
See application file for complete search history.

(56) References Cited

U.S. PATENT DOCUMENTS

| | | | |
|---|---|---|---|
| 8,095,124 B2 | 1/2012 | Balia | |
| 8,491,391 B2 | 7/2013 | Brunet de Courssou | |
| 9,299,268 B2 | 3/2016 | Aravkin | |
| 9,489,462 B1 | 11/2016 | Spertus | |
| 2012/0224828 A1* | 9/2012 | Silber | G10H 1/368 386/230 |
| 2013/0184082 A1* | 7/2013 | Patchen | A63F 13/798 463/42 |
| 2015/0246281 A1* | 9/2015 | Originale Di Criscio | A63F 13/12 463/31 |
| 2017/0034263 A1 | 2/2017 | Archambault | |
| 2017/0251040 A1 | 8/2017 | Archambault | |

* cited by examiner

*Primary Examiner* — Reginald A Renwick
(74) *Attorney, Agent, or Firm* — Nydegger & Associates

(57) ABSTRACT

A computer application in accordance with the present invention involves an interaction between a music streaming media service, a plurality of users of mobile devices, and a host mobile device. In this combination, the host sets up and controls a game wherein users interact with the music streaming media service. Playing the game requires setting a predetermined number of rounds, with each round containing music tracks from a same music genre. Users then select their favorite music track in the round, and vote on the music tracks of other users in the round, as they are played. Each user vote is weighted according to the like/dislike perception of the user, and scores for each user's favorite are tallied for the round. There can be several rounds in a game, and the user whose favorites get the most votes wins.

20 Claims, 2 Drawing Sheets

COLLABORATIVE MOBILE MUSIC GAMING COMPUTER APPLICATION

FIELD OF THE INVENTION

The present invention pertains generally to computer applications for mobile devices. More particularly, the present invention pertains to computer applications that provide entertainment for the user of a mobile device. The present invention is particularly, but not exclusively, useful as a system or method for collaboratively implementing a mobile music gaming computer application for concerted use by a plurality of participants.

BACKGROUND OF THE INVENTION

For any number of purposes, a person may decide to use a particular computer application. Considerations for doing so will typically be based on any of several motivation factors such as the person's desire for entertainment, competition, information and/or active participation. When they are all together in a same computer application, these factors can be particularly motivating for the person. For many, the incentive for using a particular computer application is particularly attractive where, such as here, the focus of the application is on music.

With the above in mind, it is an object of the present invention to provide a gaming computer application where mobile device users select their own favorite track in a music genre, and then place it in competition with the favorites of other game participants. Still another object of the present invention is to provide a computer application which controls a voting procedure by game participants as they competitively evaluate each other's music selection. Yet another object of the present invention is to provide a system and method for collaboratively implementing a mobile music gaming computer application which is easy to use, is simple to manufacture and is comparatively cost effective.

SUMMARY OF THE INVENTION

In accordance with the present invention, a computer application provides a game for competitively evaluating music selections. Specifically, the game involves an interaction between a music streaming media service, a plurality of user mobile devices, and a host mobile device. As envisioned for the present invention, there will be an "m" number of users (participants) for each game. In overview, the object of the game is for a user to get the most points for his/her music track selections during the course of the game(s).

For the present invention, a game constitutes an "n" number of rounds, with an m number of different user-selected music tracks in each round. The m number of different music tracks in a round must be different from each other, with each music track being individually selected by a different user. Further, each user will identify his/her personal music track selection as his/her favorite. All of the music tracks in a round are selected from the same music genre (e.g. hip hop, country-western, pop, rock, top hits, R&B, Reggae, classical and EDM).

During each round of the game, the music tracks are played in a random sequence and, with the exception of his/her favorite, users vote on each music track in the round. It is an important aspect of the game that, in the voting, each vote is weighted on a scale of 1-10 according to the user's like/dislike of the particular music track. After every round, the weighted votes (points) for each user's music track favorite are respectively recorded. At the end of the game, the weighted votes for each user's favorite music track selection are tabulated. The user with the most points is declared the winner, and he/she with his/her points total are posted to a leader board.

To set-up a game, a host mobile device is connected to a music streaming media service (e.g. Spotify, Apple Music, Google Music, Amazon Music or You Tube). The host will then determine an n number of rounds for the game that is to be played, and an m number of participants for the game. Users of other mobile devices are then invited to join the game until the host has the desired m number of participants.

In preparation for play, each user mobile device (participant) will choose a music genre. The host will then establish a single genre for each round in the game. Individual users will then be given a predetermined period of time (e.g. 60 seconds) to select their own personal music track favorite for each round. If it happens that a user's favorite has already been taken, that user must make another selection. There will be an m number of music tracks in each round.

Actual play begins by the host mobile device instructing the music streaming media service to begin playing the music tracks selected by users from the genre for the particular round in a random order established by the host mobile device. Each music track is played in its entirety or for a time duration set by the host (e.g. 60 seconds), and each user gives his/her weighted vote (1-10 scale) for the particular track as it is played. During a round, a user cannot vote for his/her own music track favorite, and a user must use a differently weighted vote for each music track in the round. In the case of a duplicate weighted vote, there is a default that instructs the user to vote "higher" or "lower". It is permitted, however, for different users to have the same weighted vote for the same music track of another user in the same round.

At the end of the game, a leader is declared based on the sum total of the weighted votes (points) for his/her favorite(s) collectively received during the game. Identification of the leader and his/her weighted vote total is then passed to the leader board.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
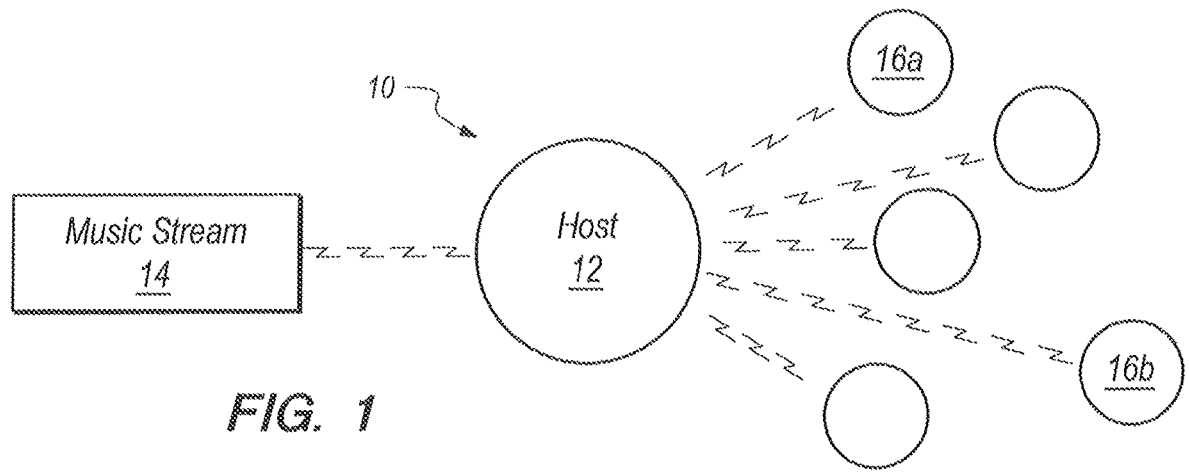
FIG. 1 is a schematic presentation of the interactive connections between a music streaming media service and various user mobile devices for implementing a music gaming computer application in accordance with the present invention.

Referring initially to FIG. 1, a system for collaboratively implementing a mobile music gaming computer application is shown and is generally designated 10. As shown, the system 10 includes a host mobile device 12 that is electronically connected to a music streaming media service 14. For the present invention, the streaming media service 14 may be of a type similar to any of the services available over the Internet, such as Spotify, Apple Music, Google Music, Amazon Music or You Tube. FIG. 1 also shows that the system 10 includes a plurality of user mobile devices 16 which are each electronically connected to the host mobile device 12. The user devices 16a and 16b which are identified in FIG. 1 are only exemplary. More specifically, the present invention envisions an m number of user devices 16, where m will typically be 10, or a number less than 10.

In accordance with the present invention, a music game is played on the system 10 by an m number of users. During the game, as disclosed in greater detail below, each user mobile device 16 votes on pre-selected music tracks provided by the music streaming media service 14. The votes are then tallied at the end of the game and a winner is declared.

Figure 2:
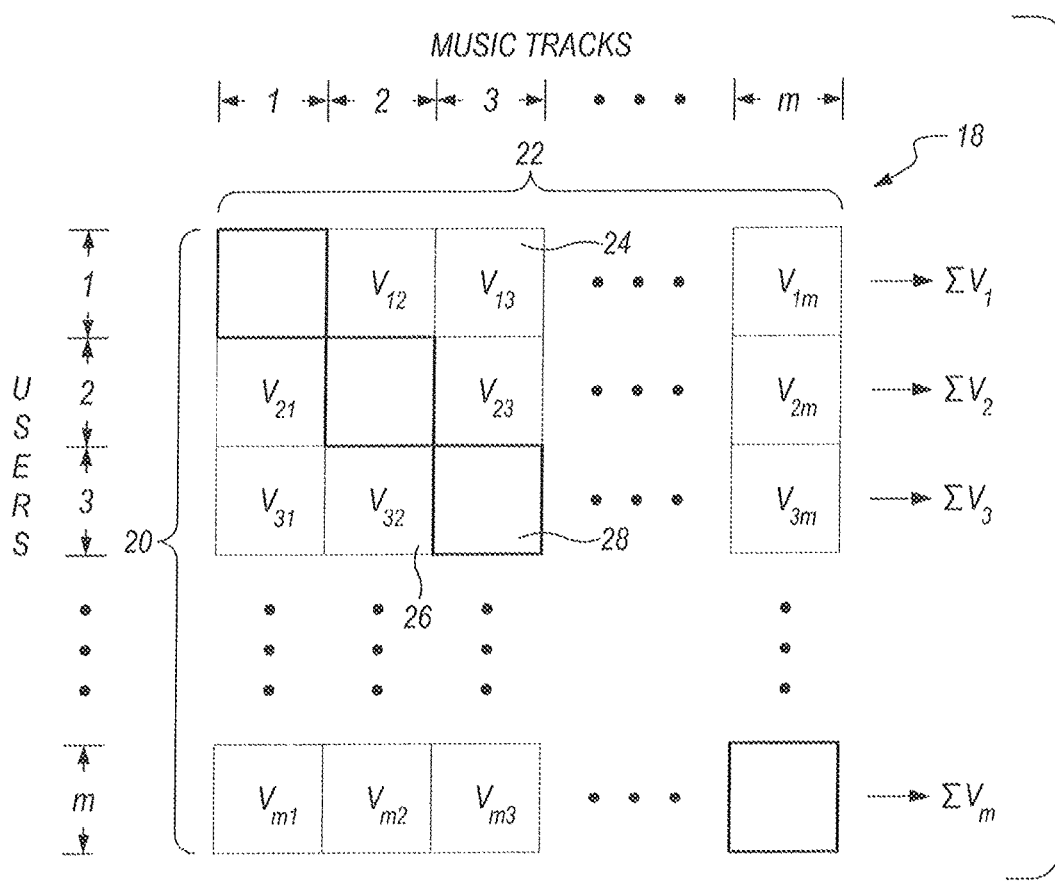
FIG. 2 is a grid showing the scoring methodology of the present invention which requires each user to have a favorite musical track and to give a weighted vote to the favorites of every other user in the game.

FIG. 2 shows the scoring methodology for the present invention during a round of voting in the game. Note: there will be an n number of rounds for each game, with the m number of user devices 16 involved in each round. For disclosure purposes, this methodology is presented as a grid 18. As shown in FIG. 2, the grid 18 includes a plurality of columns 20 and a plurality of rows 22. In this combination, each column 20 in the grid 18 distinguishes an m number of users (i.e. different user mobile devices 16), and each row 22 distinguishes an m number of music tracks.

During each round of voting in a game, a weighted vote $V_{(user)(track)}$ is recorded within the grid 18 for each user/music selection. For instance, the square 24 in grid 18 shows that user #1 scored the value of his/her weighted vote $V_{13}$ for music track #3. Similarly, the weighted vote $V_{32}$ shown in square 26 signifies that user #3 scored the value of the weighted vote $V_{32}$ for music track #2.

In accordance with the present invention, each weighted vote $V_{(user)(track)}$ has a numerical value between 1 and 10. Also, each participant/user (mobile device 16) is required to give each music track a different numerical value for its $V_{(user)(track)}$ in a particular round. In the case of a duplicate vote (i.e. votes wherein different weighted votes $V_{(user)(track)}$ have a same numerical value) the user (mobile device 16) is required to change his/her vote to a higher or lower value.

Further, in FIG. 2, weighted votes $V_{mm}$ are shown as blanks (e.g. $V_{11}=V_{22} \ldots =V_{mm}=0$). This is so because these music tracks are designated as "favorites" 28 of the respective user (mobile device 16). Accordingly, a user (mobile device 16) may not vote for its own favorite 28.

At the end of each round in a game, the score for each game participant/user (mobile device 16) is tallied as $\Sigma V_{(user)}$. At the end of a game, the total score for each user (mobile device 16), for all rounds, is then tabulated and the user (mobile device 16) with the highest vote total is declared the winner. In the event of a tie, the users (mobile devices 16) in the tie are designated finalists. A playoff round is then played by all m users and the finalist with the highest total score for the playoff round is declared the winner.

Figure 3:
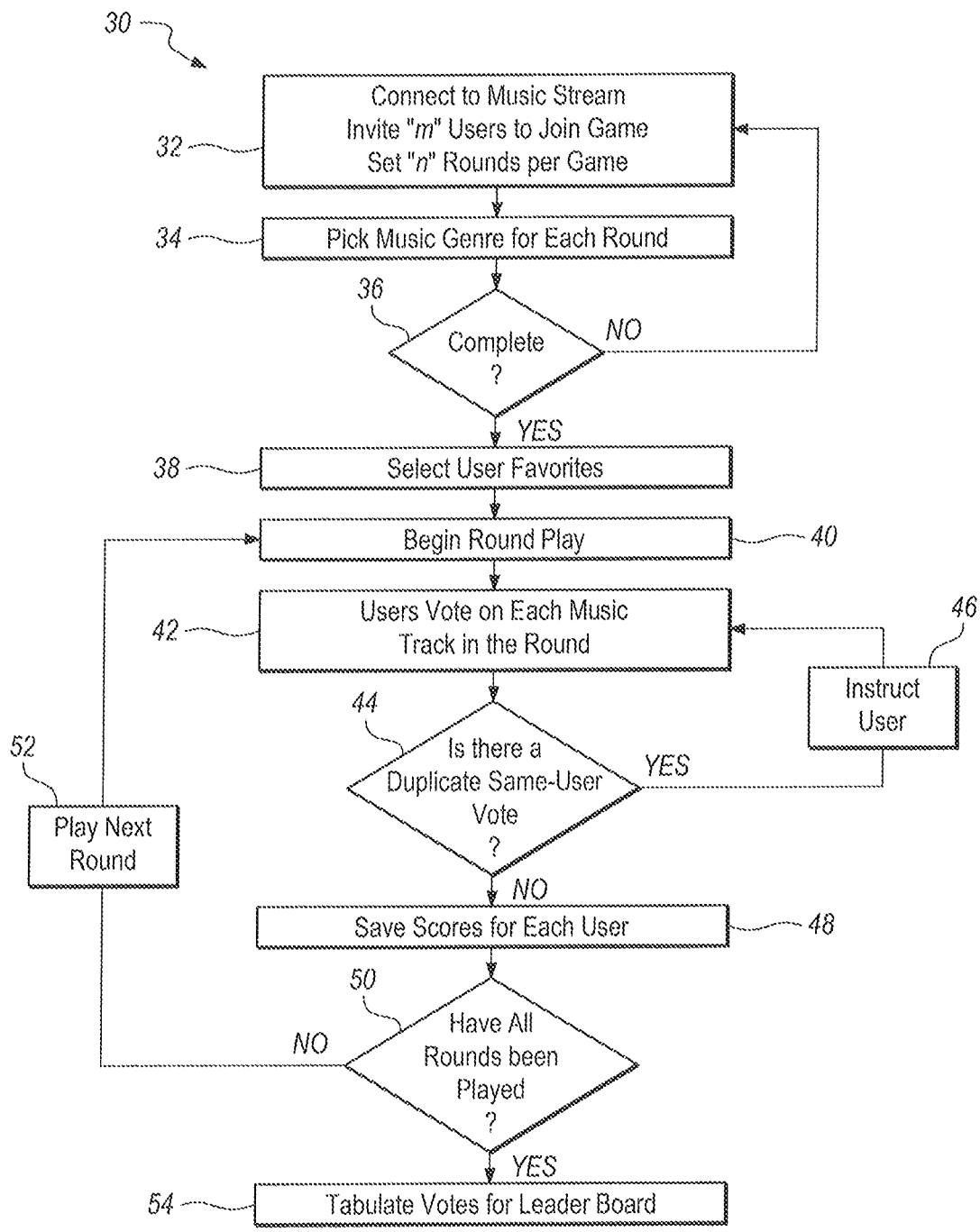
FIG. 3 is a logic flow chart showing the steps necessary to set up and control a music gaming computer application in accordance with the present invention.

Turning now to FIG. 3, a logic flow chart, which is generally designated 30, presents a methodology for conducting a collaboratively implemented mobile music gaming computer application in accordance with the present invention. Beginning with action block 32, chart 30 indicates that a host mobile device 12 must: i) electronically connect with a music streaming media service 14; ii) invite an m number of user mobile devices 16 to join a game; and iii) set an n number of rounds for each game.

Action block 34 of chart 30 then indicates that a music genre must be picked for each round. Unless already done by the host mobile device 12, the picking of music genres will typically be done by users of the mobile devices 16. As envisioned for the present invention, the genres will be picked from a group including hip hop, country-western, pop, rock, top hits, R&B, Reggae, classical and EDM. Inquiry block 36 then determines when the setup of a game has been completed for an m number of user/participants, playing in an n number of rounds with a properly picked music genre for each round.

As music tracks from the music streaming media service 14 are provided (or have been previously selected by a host/user mobile device 12/16), action block 38 indicates that each host/user mobile device 12/16 will select its favorite 28. Once the favorites 28 have been established, action block 40 indicates that playing of the game can begin.

Voting for music tracks in each round is a key aspect of the present invention. As indicated by the action block 42 in chart 30, each user mobile device 16 and the host mobile device 12 are to vote for music tracks in each round. As disclosed above with reference to FIG. 2, this voting is a weighted voting protocol. As also disclosed above, no weighted votes $V_{(user)(track)}$ can be duplicated during a round. Accordingly, inquiry block 44 checks this, and if there is a duplicate vote, action block 46 indicates that the offending mobile device 12/16 is to be notified to cast a different higher or lower weighted vote. Once there are no duplicate votes in a round, action block 48 is activated to save the scores accumulated for the favorite 28 of each user device 12/16 during the round.

Inquiry block 50 monitors the playing of the game and after each round determines whether action block 52 is appropriate and another round is to be played. After all rounds have been played in a game, action block 54 indicates that all of the weighted votes, $V_{(user)(track)}$, for all rounds are to be tabulated. The overall winner of the game, together with his/her vote total are then posted to a leaderboard (not shown). An appropriate award for the winner is then presented.

While the particular Collaborative Mobile Music Gaming Computer Application as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for collaboratively implementing a mobile music gaming computer application which comprises the steps of:

connecting a host mobile device with a music streaming media service;

inviting an m number of available user mobile devices to join the host device for a game;

setting an n number of rounds for the game;

picking a music genre for each round;

selecting an m number of respectively different music tracks from the music genre for inclusion in each round;

identifying a favorite music track for each user device in each round;

playing the n number of rounds in a predetermined sequence;

voting by each individual user device on each music track in a round, wherein each vote is numerically weighted by the user device, and wherein each music track in a round is given a different weighted vote from a same user device;

totaling the weighted votes for the favorite music track for each user device in each round; and tabulating the weighted votes for each user device during the n rounds of the game to determine a winner.

2. The method of claim 1 wherein music genres are picked from a group consisting of hip hop, country-western, pop, rock, top hits, R&B, Reggae, classical and EDM.

3. The method of claim 2 wherein the music genres are individually picked by respective user devices.

4. The method of claim 3 wherein at least one genre is picked for each round.

5. The method of claim 1 wherein each music track is played during a round in a random order determined by the host device and is played for a specified time duration established by the host device.

6. The method of claim 5 wherein the specified time duration for playing a music track during the round is in a range between 30 seconds and the entirety of the music track.

7. The method of claim 1 wherein each weighted vote is based on a like/dislike perception for the particular music track and is a number on a scale between 1 and 10.

8. The method of claim 7 wherein a weighted vote cannot be duplicated by a user device during a round.

9. The method of claim 8 further comprising the step of instructing a user device to present a "higher/lower" weighted vote in the event of a duplicated vote.

10. The method of claim 1 wherein the host device is also a user device.

11. The method of claim 1 wherein a music track is selected by a user device directly from the music streaming media service.

12. The method of claim 1 wherein a plurality of genres is picked for inclusion in at least one round.

13. The method of claim 1 wherein the selection of music tracks by a user device for the n number of rounds is accomplished within 60 seconds.

14. A computer-implemented system for using a mobile music gaming application which comprises:

a music streaming media service;

a host mobile device including a computer, wherein the host device is connected to the music streaming media service for setting up a game having an n number of music rounds for the game to be presented in a predetermined sequence, wherein a music genre is picked for each round and each round includes an m number of respectively different music tracks selected from the music genre;

an m number of available user mobile devices connected to the host device for participation in the game with the host device, wherein each user device identifies its own favorite music track in each round and wherein, during each round in the game, each user device votes on the music tracks selected by other user mobile devices with a numerically different weighted vote for each music track; and a compiler included in the computer of the host device for totaling the weighted votes for the favorite music track of each user device in each round, and for tabulating the weighted votes for each user device during the n rounds of the game to determine a winner.

15. The computer-implemented system of claim 14 wherein a genre is picked for each round from a group consisting of hip hop, country-western, pop, rock, top hits, R&B, Reggae, classical and EDM, and each genre is individually selected by respective user devices.

16. The computer-implemented system of claim 15 wherein each music track is played during a round in a random order determined by the host device and is played for a specified time duration established by the host device, wherein the specified time duration for playing a music track during the round is in a range between 30 seconds and the entirety of the music track.

17. The computer-implemented system of claim 16 wherein each weighted vote is based on a like/dislike perception for the particular music track and is a number on a scale between 1 and 10, and wherein the weighted vote cannot be duplicated by a user device during a round.

18. A non-transitory, computer-readable medium having executable instructions stored thereon that direct a computer system to perform a process for using a mobile music gaming application, the medium comprising instructions for:

connecting a host mobile device to a music streaming media service for setting up a game with an n number of music rounds for the game, by picking a music genre for each round, wherein each round includes an m number of respectively different music tracks selected from the music genre;

connecting an m number of available user mobile devices to the host device for participation in the game with the host device, wherein each user device identifies its own favorite music track in each round and wherein, during each round in the game, each user device votes on the music tracks selected by other user mobile devices with a numerically different weighted vote; and totaling the weighted votes for the favorite music track of each user device in each round as the n number of rounds are presented in a predetermined sequence, and for tabulating the weighted votes for each user device during the n rounds of the game to determine a winner.

19. The medium of claim 18 wherein each music track is played during a round in a random order determined by the host device for a specified time duration established by the host device, and the specified time duration for playing a music track during the round is in a range between 30 seconds and the entirety of the music track.

20. The medium of claim 19 further comprising instructions for:

voting by a user device with a weighted vote based on a like/dislike perception for the particular music track, wherein the weighted vote is a number on a scale between 1 and 10, and cannot be duplicated by the user device during a round.

* * * * *